United States Patent [19]

Bolick, Jr. et al.

[11] 4,007,491
[45] Feb. 8, 1977

[54] DICTATION-TRANSCRIPTION METHOD AND SYSTEM

[75] Inventors: Fred C. Bolick, Jr., Atlanta, Ga.; Ronald F. Fleming, Farmington, Conn.

[73] Assignee: Lanier Business Products, Inc., Atlanta, Ga.

[22] Filed: Feb. 10, 1975

[21] Appl. No.: 548,543

Related U.S. Application Data

[63] Continuation of Ser. No. 391,685, Aug. 27, 1973, abandoned, which is a continuation of Ser. No. 149,480, June 3, 1971, abandoned.

[52] U.S. Cl. .................. 360/74; 179/100.1 DR; 360/72
[51] Int. Cl.² ............... G11B 15/06; G11B 15/18; G11B 27/30; G11B 23/38
[58] Field of Search ............ 360/74, 71–72, 360/90, 137; 179/100.1 DR

[56] References Cited

UNITED STATES PATENTS

| | | | |
|---|---|---|---|
| 2,306,614 | 12/1942 | Clausen | 179/100.4 |
| 3,192,509 | 6/1965 | Durand et al. | 360/72 |
| 3,467,791 | 9/1969 | Bolick, Jr. | 360/90 |
| 3,660,616 | 5/1972 | Davidge et al. | 179/100.1 DR |
| 3,662,121 | 5/1972 | Cruger | 360/74 |
| 3,671,683 | 6/1972 | Rahenkamp et al. | 179/100.1 DR |
| 3,758,726 | 9/1973 | Bolick, Jr. et al. | 179/100.1 DR |
| 3,869,720 | 3/1975 | Ohira et al. | 360/72 |
| 3,918,086 | 11/1974 | Blackie et al. | 360/74 |

FOREIGN PATENTS OR APPLICATIONS

681,773   3/1964   Canada

Primary Examiner—Alfred H. Eddleman

[57] ABSTRACT

A dictation-transcription method and system in which dictated material and indexing signals are simultaneously or alternately recorded on the same recording medium and in which the indexing signals are subsequently used for providing indexing information for use in the transcribing of the dictated material. The system includes a dictate control by which dictated material and indexing signals are simultaneously or alternately recorded on the same recording medium during the dictating of the dictated material, a recording medium having recorded thereon both dictated material and indexing signals, and a transcribe control which provides an indexing mode of operation of the system during which the indexing signals are used to provide indexing information in visible, audible or some other form and a transcribing mode of operation of the system during which the dictated material is transcribed utilizing the indexing information. The method includes the steps of simultaneously or alternately recording dictated material and indexing signals on the same recording medium, subsequently providing indexing information in response to the indexing signals recorded on the recording medium, and transcribing the dictated material using the indexing information. Both the method and the system also provide for the use of indexing signals in controlling functions such as forward reset during dictating and scanning for instructions prior to or during transcribing.

30 Claims, 14 Drawing Figures

INVENTORS
Fred C. Bolick, Jr.
BY Ronald F. Fleming

Jones & Thomas
ATTORNEYS

INVENTORS
Fred C. Bolick, Jr.
BY Ronald F. Fleming
Jones & Thomas
ATTORNEYS

DICTATION-TRANSCRIPTION METHOD AND SYSTEM

This is a continuation of application Ser. No. 391,685, filed Aug. 27, 1973, and now abandoned, which is a continuation of application Ser. No. 149,480, filed June 3, 1971, and now abandoned.

BACKGROUND OF THE INVENTION

1. Field of the Invention

This invention relates to a method of and a system for recording dictated material such as speech on a recording medium and for subsequently transcribing the dictated material from the recording medium and more particularly, to a method of and system for recording dictated material simultaneously or alternately with indexing signals on a recording medium and for subsequently using the indexing signals to provide indexing information for use in the transcribing of the dictated material from the recording medium.

2. Discussion of the Prior Art

Dictation-transcription systems are known in a variety of types. Included among the variety of types of dictation-transcription systems is a system which uses a recording medium having a discrete length and in which the recording medium is generally transferred from a dictation unit to a transcription unit after the dictation of the dictated material and before the transcribing of the dictated material. Also included among the variety of types of dictation-transcription systems is a system which uses an endless recording medium and in which a portion of the recording medium is placed in one tape bin after the dictating of dictated material and before the transcribing of the dictated material and is placed into another tape bin after the transcribing of the dictated material and before the recording of additional dictating material.

With respect to the first of these types of dictation-transcription systems, there have been many prior art attempts to provide indexing information which shows the locations on the recording medium of the beginnings of units of dictated material such as letters and of special instructions included in the dictated material. Some of these prior art attempts have resulted in indexing information being presented simply as a printed index strip on which notations with a pencil or the like are made during the course of dictating. Others of these prior art attempts have resulted in indexing information being provided by an index strip on which marks are automatically made in response to the operation of a switch or the like.

In almost all of these prior art attempts to provide indexing information, the indexing information has been provided during the dictating of the dictated material. As a result, it has been necessary to use considerable care to keep the indexing information relating to the dictated material on a particular recording medium associated with that recording medium since if the indexing information is lost or exchanged with the indexing information relating to the dictated material on another recording medium, the indexing information is substantially useless.

Moreover, in most of these prior art attempts to provide indexing information, the indexing information has been difficult or substantially impossible to duplicate once it has been provided during the dictating of the dictated material. Thus, indexing information which is lost or exchanged as described above has been difficult or impossible to duplicate. Furthermore, in addition to these problems, many of these prior art attempts to provide indexing information have resulted in the indexing information being in a form which makes it difficult to correlate with the dictated material during the transcribing of the dictated material.

With respect to the second of the two types of dictation-transcription systems described above, prior art attempts to provide indexing information have generally resulted in indexing information which indicates little more than the total amount of dictation on a recording medium. Thus, with this type of dictation-transcription system, it has generally been impossible during the transcribing of the dictated material to accurately and conveniently locate instructions included within the dictated material or the beginnings of units of dictated material. This lack of indexing information is particularly serious with this type of dictation-transcription system since this type of system lends itself to the dictating of dictated material which is of substantial length and which includes many units of dictated material.

SUMMARY OF THE INVENTION

A method or system embodying the invention disclosed herein overcomes the above-mentioned and other problems encountered in the prior art by recording both dictated material and indexing signals on a recording medium, continuously storing the dictated material and the indexing signals on the recording medium, and providing indexing information in response to the indexing signals prior to the transcribing of the dictated material and as frequently as may be required. When embodied in a dictation-transcription system, the invention includes means for recording both dictated material and indexing signals on a recording medium, a recording medium for continuously storing the dictated material and the indexing signals, signal means responsive to the recording medium for separating the dictated material and the indexing signals, information means for providing indexing information in response to the indexing signals, and control means for controlling the motion of the recording medium in response to indexing signals.

When embodied in a method, the invention includes the steps of recording indexing signals simultaneously or alternately with dictated material during the dictating of the dictated material, storing the dictated material and the indexing signals simultaneously and continuously on a recording medium, providing indexing information in response to the indexing signals, and using the indexing information in the subsequent transcribing of the dictated material or in controlling one or more modes of operation of a dictation-transcription system. Whether embodied in a system or a method, the invention provides for indexing information subsequent to the dictating of dictated material and as frequently as the indexing information is required.

Moreover, the indexing information is always properly correlated with the dictated material since it is responsive to indexing signals having a fixed continuing relationship to the dictated material and since it is most conveniently provided in connection with the transcribing of the dictated material rather than in connection with the dictating of the dictated material. These and other features and advantages of the invention will become more apparent from a consideration of the

BRIEF DESCRIPTION OF THE DRAWING

FIG. 12 is a schematic representation illustrating a sixth embodiment of the invention disclosed herein;

FIG. 13 is a schematic perspective view of an information means for providing indexing information as visible information; and, FIG. 14 is a schematic representation illustrating an information means for providing indexing information as audible information.

DESCRIPTION OF SEVERAL EMBODIMENTS

The invention disclosed herein is best understood in terms of a dictation-transcription system which provides that indexing information required for the efficient transcribing of dictated material at any time subsequent to the dictating of the dictated material and as frequently as may be necessary. The indexing information provided by the invention may be any of a variety of types of information relating to the dictated material, but the several embodiments of the invention described below are most easily described in terms of conventional indexing information such as that relating to the total length of the dictated material, the locations in the dictated material of instructions for transcribing the dictated material, and the locations in the dictated material of the ends of units of dictated material such as letters or reports.

Total length of the dictated material is indexing information which is used in the transcribing of the dictated material as an indication of the total amount of dictated material which must be transcribed and in the invention disclosed herein, this indexing information is related to a time line which is recorded an an indexing signal on a recording medium during the dictating of the dictated information. For convenience of description, the term "time line" is used herein for both this indexing information and its related indexing signal.

The locations in the dictated material of instructions for transcribing the dictated material are indexing information which is used in the transcribing of the dictated material to locate quickly and efficiently instructions with respect to the dictated material and in the invention disclosed herein this indexing information is related to an instruction signal which is recorded as an indexing signal on a recording medium during the dictating of the dictated material each time an instruction concerning the dictated material is to be included in the dictated material. For convenience of description, the term "instruction signal" is used herein for both this indexing information and its related indexing signal.

The locations in the dictated material of the ends of units of dictated material are indexing information which is used in the transcribing of the dictated material to locate quickly and efficiently the beginnings of units of dictated material in terms of ends of previous units of dictated material and in the invention disclosed herein, this indexing information is related to an end signal which is recorded as an indexing signal on a recording medium during the dictating of the dictated material each time the dictating of a unit of dictated material is completed. For convenience of description, the term "end signal" is used herein for both this indexing information and its related indexing signal.

Thus, it will be understood that in the invention disclosed herein, the time lines, the instruction signals and the end signals are all indexing signals in the form of recorded indicia which are recorded on a recording medium and from which indexing information related to each is provided. It will also be understood that the invention may be embodied in dictation-transcription systems of a variety of different types. Since each of these different types of dictation-transcription systems will be understood by those skilled in the art, only two types of dictation-transcription systems are shown in the drawing. Moreover, these two types are shown only generally in FIGS. 1 and 2 because their construction and operation are conventional except insofar as they are modified by an embodiment of the invention as will be readily understood by those skilled in the art once the invention is understood.

Figures 1, 2:
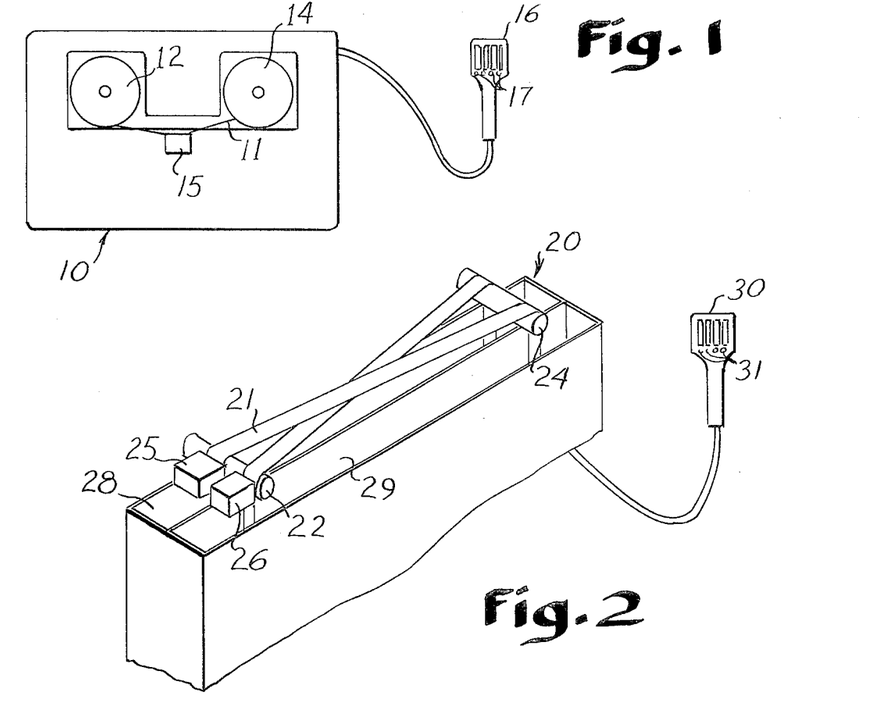
FIG. 1 is a schematic plan view of a dictation-transcription system of the type which uses a recording medium having a discrete length and in which the invention disclosed herein may be embodied.
FIG. 2 is a schematic perspective view of a dictation-transcription system of the type which uses an endless recording medium and in which the invention disclosed herein may be embodied.

The dictation-transcription systems shown in FIGS. 1 and 2 both include a recording medium on which dictated material is stored. The recording medium in each system is most conveniently a magnetically responsive recording medium, such as a tape, which in response to changes in magnetic flux records dictated material and indexing signals as magnetic conditions. However, in other types of dictation-transcription systems in which the invention may be embodied, the recording medium may be a relatively wide belt or a relatively rigid and flat surface such as a disk.

The particular type of dictation-transcription system 10 which is shown in FIG. 1 is generally described in U.S. Pat. Nos. 3,424,965, 3,439,919 and 3,495,835. This type of dictation-transcription system 10 includes a recording medium in the form of a tape 11 which has a discrete length and which is wound on a pair of spools 12 and 14. The spools 12 and 14 may or may not be in a cassette (not shown) but their arrangement is such that the tape 11 is wound between one spool 12 and the opposite spool 14 across a recording-listening head 15. As the tape 11 is moved relative to a recording-listening head 15, the recording-listening head 15 responds to variations in magnetic flux on the tape 11 in the case of transcribing, or variations in magnetic flux caused by the recording-listening head 15 are recorded on the tape 11 in the case of recording.

A microphone 16 is provided as an input means for the dictated material to be recorded on the tape 11, and various switches and buttons 17 are included in the microphone 16 and elsewhere in the system 10 to provide the various conventional modes of operation of the system 10. It will be understood that a recording-listening head 15 may be a two-track head, four-track head, eight-track head or larger size head, or it may be a plurality of separate heads, depending upon the number of tracks on a recording medium which are utilized by the dictation-transcription system 10 shown in FIG. 1 to provide an embodiment of the invention disclosed herein.

The particular type of dictation-transcription system 20 which is shown in FIG. 2 is generally described in U.S. Pat. Nos. 3,467,790, 3,467,791 and 3,482,751. This type of dictation-transcription system 20 includes a recording medium in the form of a continuous tape 21 which passes over drive capstans 22 and 24 and listening-recording heads 25 and 26. The tape 21 is stored in a transcribed-tape bin 28 after the transcribing of dictated material but before the recording of new dictated material and in a recorded-tape bin 29 after the recording of dictated material but before the transcribing of the dictated material. A microphone 30 is provided as an input means for dictated material to be recorded on the tape 21 and various buttons and switches 31 are included in the microphone 30 and elsewhere in the system 20 to provide the various conventional modes of operation of the system 20.

As with the system 10 shown in FIG. 1, it will be understood that each of the listening-recording heads 25 and 26 in the system 20 shown in FIG. 2 can be a two-track, four-track head, eight-track head or larger size head, or a plurality of separate heads, depending upon the number of tracks on a recording medium which are utilized by the dictation-transcription system shown in FIG. 2 to provide an embodiment of the invention disclosed herein. It will also be understood from the following description of several embodiments of the invention that the number of tracks on a recording medium which are utilized in a dictation-transcription system 10 or 20 or in another type of system to provide one of these several embodiments of the invention depends upon which of these several embodiments of the invention is provided.

The several embodiments of the invention are best described by initially describing the embodiments in terms of a recording medium in each embodiment as shown in FIGS. 3 through 6. In each of FIGS. 3 through 6, the condition of a recording medium is graphically represented by the electrical inputs to a recording head or other recording means which caused the magnetic or other condition of the recording medium. However, these electrical inputs are the same as the electrical outputs of a listening head or other means in response to the magnetic or other condition of the recording medium. Thus, for convenience of description, the condition of a recording medium graphically represented in FIGS. 1 through 6 will be understood to be representative not only of what is recorded on a recording medium but also of the electrical input to a recording head which caused the condition and of the electrical output from a listening head responsive to the condition.

Figure 3:
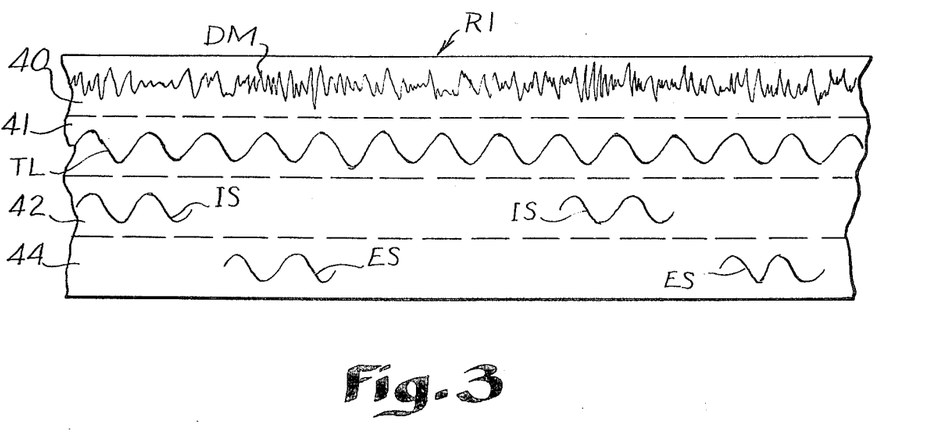
FIG. 3 is a graphic representation of a portion of a recording medium in a first embodiment of the invention disclosed herein.

This will be better understood after considering the recording medium R1 in a first embodiment of the invention as shown in FIG. 3. From FIG. 3 it will be seen that the recording medium R1 has a first track 40 which is used as a dictated material track. The dictated material DM, usually speech, is graphically represented in FIG. 3 by a plurality of frequencies in the audio range of frequencies and when the dictated material DM is referred to herein as an input to a recording head or an output from a listening head, the dictated material DM will be understood to be an electrical input or output defined by a plurality of frequencies in the audio range of frequencies.

The recording medium R1 also has a second track 41 on which a time line TL is recorded as an indexing signal. The time line TL is graphically represented in FIG. 3 by a continuous wave of constant amplitude and frequency which is coextensive with the dictated material DM on the first track 40 and when the time line TL is referred to herein as an input to a recording head or an output from a listening head, the time line TL will be understood to be an electrical input or output defined by a continuous wave of constant amplitude and frequency. The recording medium R1 further has a third track 42 on which instruction signals IS are recorded as indexing signals. The instruction signals IS are graphically represented in FIG. 3 by short pulses of a wave having a particular frequency and when an instruction signal IS is referred to herein as an input to a recording head or an output from a listening head, an instruction signal IS will be understood to be a short electrical input or output defined by a particular frequency.

In addition to the tracks 40, 41 and 42, the recording medium R1 has a fourth track 44 on which end signals ES are recorded as indexing signals. The end signals ES are graphically represented in FIG. 3 by short pulses of a wave having a particular frequency and when an end signal ES is referred to herein as an input to a recording head or an output from a listening head, and end signal ES will be understood to be a short electrical input or output defined by a particular frequency. Since the tracks 40, 41, 42 and 44 serve to physically separate the dictated material DM, the time line TL, instruction signals IS, and end signals ES from each other by location, the indexing signals TL, IS and ES are distinguished from each other and from the dictated material DM on the recording medium R1 simply by location on the recording medium R1.

Figure 4:
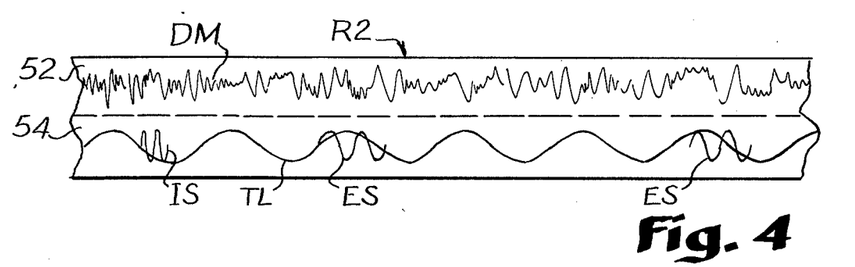
FIG. 4 is a graphic representation of a portion of a recording medium in a second embodiment of the invention disclosed herein.

Referring to FIG. 4 of the drawings and the recording medium R2 in a second embodiment of the invention, it is seen that the recording medium R2 also has a first track 52 and a second track 54. The first track 52 has only the dictated material DM recorded thereon while the second track 54 has a time line TL, end signals ES, and instruction signals IS recorded thereon. It will be understood that in this embodiment of the invention, the time line TL, the end signals ES, and the instruction signals IS all have different frequencies so that these indexing signals TL, ES and IS are distinguished from each other by frequency.

Figure 5:
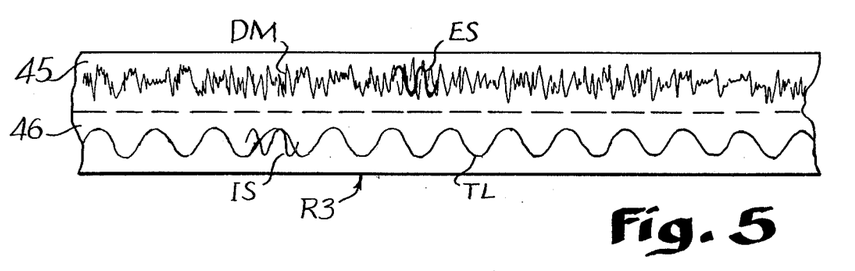
FIG. 5 is a graphic representation of a portion of a recording medium in a third embodiment of the invention disclosed herein.

A recording medium R3 in a third embodiment of the invention is shown in FIG. 5. The recording medium R3 has only a first track 45 and a second track 46. The first track 45 has recorded thereon the dictated material DM; and, superimposed on the dictated material DM are the end signals ES. Since the dictated material DM and end signals ES are both on the first track 45, the end signals ES have a frequency which is outside the audio range of frequencies so that they are distinguished from the dictated material DM by frequency. The second track 46 has a time line TL and instruction signals IS recorded thereon. The time line TL and the instruction signals IS have different frequencies so that instruction signals IS are distinguished from the time line TL on the basis of frequency.

Figure 6:
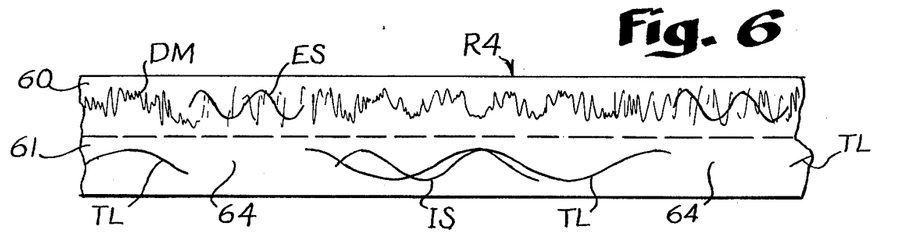
FIG. 6 is a graphic representation of a portion of a recording medium in a fourth embodiment of the invention disclosed herein.

FIG. 6 shows the recording medium R4 in a fourth embodiment of the invention. The recording medium R4 has a first track 60 on which both the dictated material DM and end signals ES are recorded. The end signals ES have a frequency which is outside the audio range of frequencies so that they are distinguished from the dictated material DM by frequency. A second track 61 has recorded thereon the time line TL and instruction signals IS, the two indexing signals TL and IS having different frequencies so that they are distinguished by frequency.

Further, in the embodiment of the invention shown in FIG. 6, there is a gap 64 in the time line TL corresponding to each end signal ES. This gap 64 serves to verify that an end signal S is in fact an end signal ES and not some spurious pulse at a frequency outside the audio range of frequencies. Thus, in the embodiment of the invention shown in FIG. 6, two simultaneous indicia conditions are used to indicate the end of a unit of dictated material DM with increased reliability.

From the foregoing description of four recording medium R1, R2, R3 and R4 in embodiments of the invention disclosed herein, it will now be understood that a dictationtranscription system 10 or 20 embodying the invention includes not only a recording medium R1, R2, R3 or R4 and a conventional recording means for recording dictated material DM on a recording medium R1, R2, R3 or R4 when the system 10 or 20 is operating in a recording mode of operation, but also an operating means for selectively recording indexing signals TL, IS and ES on the recording medium R1, R2, R3 or R4. This operating means and other features of the invention will be better understood from a consideration of the six embodiments of the invention shown in FIGS. 7 through 12. In each of these figures, an embodiment of the invention is shown only as a schematic representation since the embodying of the invention in a dictation-transcription system 10 or 20 will be readily apparent to those skilled in the art once the invention is understood.

Figure 7:
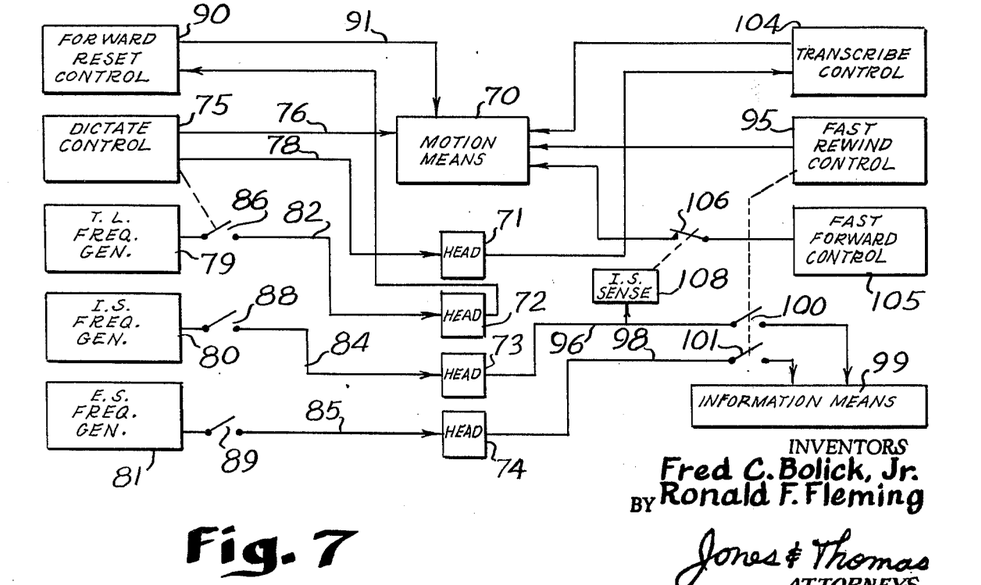
FIG. 7 is a schematic representation illustrating the first embodiment of the invention for which the recording medium is shown in FIG. 3.

In the embodiment of the invention shown in FIG. 7 the recording medium R1 is as shown in FIG. 3. From FIG. 7 it will be seen that this embodiment of the invention includes a motion means 70 for moving the recording medium R1 past a recording means provided by four listening-recording heads 71, 72, 73 and 74. The embodiment also includes a dictate control 75 which is shown as a box because it is conventional. However, it will be understood that the dictate control 75 includes devices such as a microphone 16 or 30 and control switches 17 or 31 operative to provide various modes of operation.

As indicated by the connector 76, the dictate control 75 controls the operation of the motion means 70. During a recording mode of operation, dictated material DM passes by a connector 78 to the listening-recording head 71 so that the dictated material DM is recorded on the first track 40 of the recording medium R1. The embodiment of the invention shown in FIG. 7 also has three frequency generators 79, 80 and 81. The frequency generators 79, 80 and 81 are connected by connectors 82, 84 and 85 respectively to the listening-recording heads 72, 73 and 74 respectively.

A normally open switch 86 is in the connector 82 and the switch 86 is closed by operation of the dictate control 75 when the dictate control 75 is operative to provide a recording mode of operation for recording dictated material DM. Thus, while dictated material DM is being recorded on the recording medium R1 by the listening-recording head 71, the frequency generator 79 is simultaneously operative to provide an electrical input having a constant frequency and amplitude to the listening-recording head 72. The result is the recording of a recorded indicium on the second track 41 of the recording medium R1 which serves as a time line TL.

The connector 84 includes a momentary contact switch 88 which, when manually closed, makes electrical contact for only a brief interval of time. Thus, each time the switch 88 is manually closed during the dictation of dictated material DM because instructions are to be included in the dictated material DM, a frequency pulse from the signal generator 80 is applied to the listening-recording head 73. This frequency pulse causes a recorded indicium on the third track 42 of the recording medium R1 which serves as an instruction signal IS.

The connector 85 includes a momentary contact switch 89 which, when manually closed, makes electrical contact for only a brief interval of time. Thus, each time the switch 88 is manually closed during the dictating of dictated material DM because of the end of a unit of dictated material DM has been reached, a frequency pulse from the signal generator 81 is applied to the listening-recording head 74. This frequency pulse causes a recorded indicium on the fourth track 44 of the recording medium R1 which serves as end signals ES.

It will now be understood that the switches 86, 88 and 89 serve in the embodiment of the invention shown in FIG. 7 as a plurality of operating means for selectively recording indexing signals as indicia on the recording medium R1. The embodiment of the invention shown in FIG. 7 also includes a forward reset control 90 which operates the motion means 70 as indicated by the connector 91. Those skilled in the art will understand that when a forward reset control 90 is operated after a recording medium R1 has been moved in recording-reverse direction opposite to the recording direction in which it is moved during the recording of dictated material DM, the recording medium R1 is returned to its position prior to its motion in the recording-reverse direction. In the embodiment of the invention shown in FIG. 7, the forward reset control 90 is arranged to be operative not only in response to the usual control switch (not shown) but also in response to the time line TL. Since the time line TL is recorded for the same duration as, and is coextensive with, the dictated material DM, sensing of the time line by the listening-recording head 72 provides convenient indexing information for a forward reset mode of operation in which the forward reset control 90 causes the forward reset control 90 to operate the motion means 70 for the proper duration.

Thus far, the embodiment of a dictation-transcription system 10 or 20 shown in FIG. 7 has been described in terms of dictating dictated material DM, and it will be seen that the dictated material DM has been recorded on the first track 40 by the listening-recording head 71, the time line TL has been recorded on the second track 41 by the listening-recording head 72, instruction signals IS have been recorded on the third track 42 by the listening-recording head 73, and end signals ES have been recorded on the fourth track 44 by the listening-recording head 74. Therefore, the recording medium R1 is in substantially that condition which is shown in FIG. 3 and described above.

Further description of the embodiment of the invention shown in FIG. 7 will be in terms of preparing for the transcribing of the dictated material DM from the recording medium R1 and it will be assumed for purposes of description that the embodiment is embodied in a dictation-transcription system using a recording medium R1 having a discrete length, such as in the system shown in FIG. 1. Thus, since the recording medium R1 has been run in a recording direction to record the dictated material DM, the first step in preparing for the transcribing of the dictated material DM is to rewind the recording medium R1 using a conventional fast rewind control 95 which when operated causes the motion means 70 to rewind the recording medium R1 in recording-reverse direction at high speed. It will be understood that while the recording medium R1 is being rewound, the recording medium R1 is being scanned by the four listening-recording heads 71, 72, 73 and 74 and for convenience, this mode of operation of this and other embodiments of the invention will be referred to as an indexing mode of operation.

When the embodiment shown in FIG. 7 is operating in an indexing mode of operation, the listening-recording heads 71, 72, 73 and 74 become responsive to the indicia recorded on the recording medium to provide the indexing signals TL, IS and ES as outputs. The instruction signals IS and the end signals ES from the heads 73 and 74 respectively are applied by connectors 96 and 98 to an information means 99 for providing indexing information when switches 100 and 101 in the connectors 96 and 98, respectively, are closed in response to the fast rewind control 95 being operative. Thus, a signal means is provided for providing the indexing signals IS and ES recorded on the recording medium R1 to an information means 99 which provides indexing information in response to the indexing signals IS and ES recorded on the recording medium R1.

The embodiment of the invention shown in FIG. 7 also includes a conventional transcribe control 104 having a means to operate the motion means 70 during a transcribing mode of operation and a means for providing an audio output in response to the dictated material DM. In addition, the embodiment of FIG. 7 includes a conventional fast forward control 105 to provide high speed motion of the recording medium R1 in the transcribing direction when a switch 106 is closed. However, in the invention, the switch 106 is opened by the pulse output of an instruction signal sensor 108 connected to the connector 96.

The connector 96 is connected to the listening-recording head 73 which is responsive to instruction signals IS, and as a result, the instruction signal sensor 108 causes the switch 106 to open and thereby stop the high speed motion of the recording medium R1 whenever an instruction signal IS appears on the recording medium R1. Since an instruction signal IS is placed on the recording medium R1 during dictating of the dictated material DM to indicate the location in the recorded material DM of instructions with respect to the recorded material DM, the high speed motion of the recording medium R1 is stopped at each position of the recording medium R1 at which an instruction on the recording medium R1 can be heard by the subsequent normal operation of the transcribe control 104.

After each particular instruction is heard, the fast forward control 105 is again opeated by closing the switch 106 to cause high speed motion of the recording medium R1 until the next instruction signal IS causes the switch 106 to again be opened. It will be understood that the response of an instruction signal sensor 108 to instruction signals IS which is described provides an instruction scanning mode of operation in which indexing information IS is used to locate instructions included in the dictated material DM.

Figure 8:
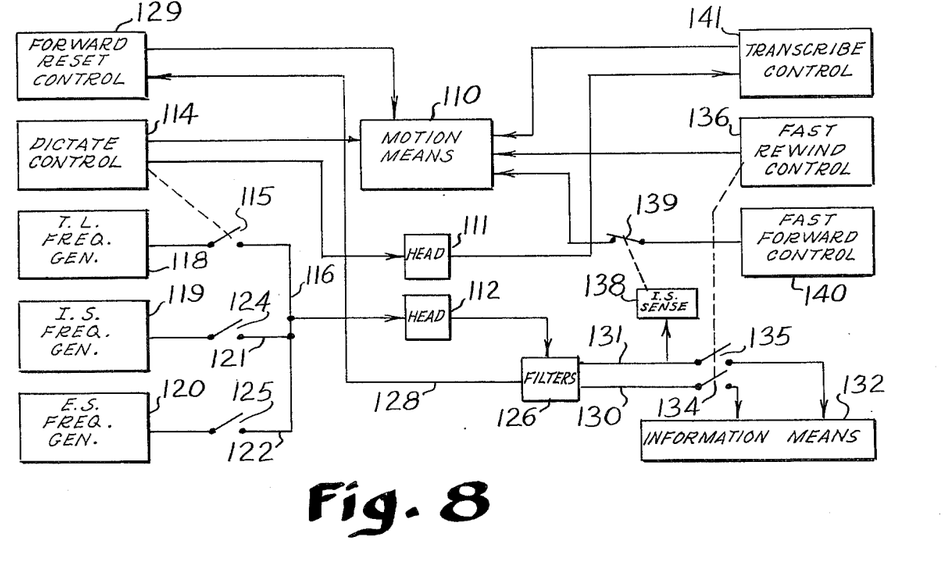
FIG. 8 is a schematic representation illustrating the second embodiment of the invention for which the recording medium is shown in FIG. 4.

A second embodiment of the invention is shown in FIG. 8. In this embodiment, the condition of the recording medium R2 is as shown in FIG. 4. Thus, the recording medium R2 has the dictated material DM on the first track 52, and the time line TL, instruction signals IS, and end signals ES on the second track 54. Although only two tracks 52 and 54 are required on a recording medium R3 by the embodiment of the invention shown in FIG. 8, it will be understood that the recording medium R2 may have four or more tracks with the additional tracks simply providing for the use of recording medium R2 along its entire length two or more times. Such use of a recording medium R2 is known to those skilled in the art.

The embodiment of FIG. 8 includes a dictate control 114 which serves as a recording means to operate a motion means 110 and cause a listening-recording head 111 to record the dictated material DM on the first track 52 of the recording medium R2. The dictate control 114 also operates a switch 115 which is in a connector 116 between a frequency generator 118 and a listening-recording head 112 so that, when the switch 115 is closed, a frequency generator 118 will provide a time line TL to be recorded on the second track 54 of the recording medium R2. As with the embodiment of FIG. 7, the arrangement in FIG. 8 is such that any time the dictate control 114 is operated, the switch 115 is closed so that the time line TL corresponds in length to the dictated material DM.

The embodiment of the invention in FIG. 8 also includes frequency generators 19 and 120, each having a frequency output which differs in frequency from that of the other and from that of the frequency generator 118. The frequency generators 119 and 120 are connected by connectors 121 and 122, respectively, through switches 124 and 125, respectively, to the connector 116. Thus, all three frequency generators 118, 119 and 120 are connected to the listening-recording head 112. The switches 124 and 125 correspond to the switches 88 and 89 in the embodiment of the invention shown in FIG. 7 and are used for the recording of instruction signals IS and end signals ES, respectively.

It will now be understood that in the embodiment of the invention shown in FIG. 8, the dictated material DM is recorded on the first track 52, and the time line TL, instruction signals IS and end signals ES are recorded during dictating on the second track 54. To separate the three indexing signals on the second track 54 for use during an indexing mode of operation, an instruction scanning mode of operation, or a forward reset mode of operation, as in the embodiment of the invention shown in FIG. 7, the embodiment shown in FIG. 8 includes a conventional filter network 126 connected to the listening-recording head 112 so that as the head 112 responds to indexing signals, the indexing signals are separated in accordance with their respective frequencies to provide three separate indexing signals.

As shown in FIG. 8, the time line TL is directed by the connector 128 to a forward reset control 129. The forward reset control 129 is similar to the forward reset control 90 in the embodiment shown in FIG. 7 and utilizes the time line TL as an indexing signal in the same manner in a forward reset mode of operation.

The end signals ES and instruction signals IS are directed from the filter network 126 by connectors 130 and 131, respectively, to an information means 132 through switches 134 and 135 respectively. As in the embodiment of FIG. 7, the switches 134 and 135 are used for an indexing mode of operation and are closed in response to a fast rewind control 136 becoming operative to cause high speed motion of the recording medium R3 in the transcribing-reverse direction.

Also, as in the embodiment of FIG. 7, there is an instruction signal sensor 138 responsive to instruction signals IS when a fast forward control 140 has been operated by a switch 134 to cause high speed motion of the recording medium R2 in the transcribing direction. Thus, the embodiment provides for an instruction scanning mode of operation and each time an instruction signal IS is encountered on the recording medium R2 by the listening-recording head 112, the instruction signal sensor 138 opens the switch 139 to deactivate the fast forward control 140 and provide for listening to an instruction by operation of a conventional transcribing means such as a transcribe control 141.

Figure 9:
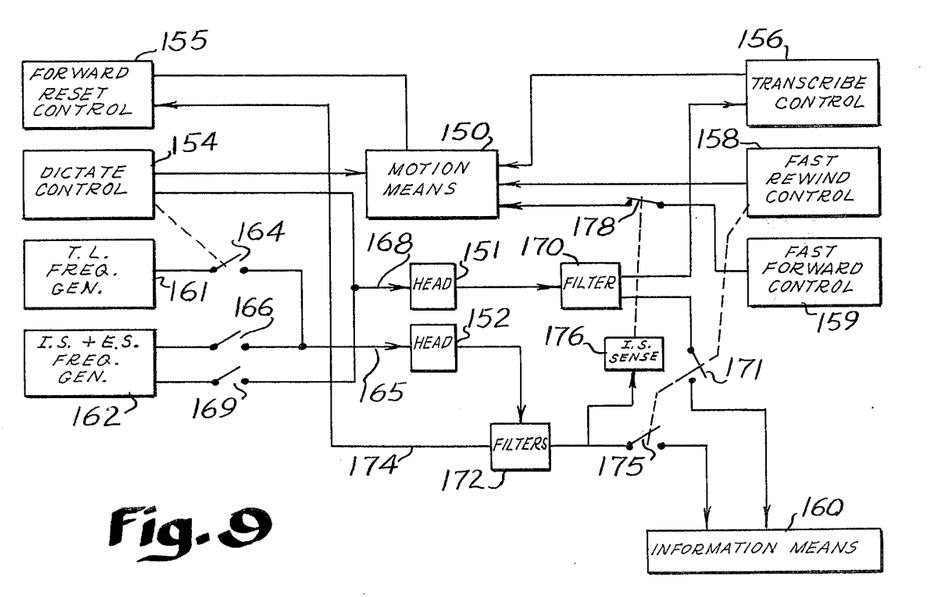
FIG. 9 is a schematic representation illustrating the third embodiment of the invention for which the recording medium is shown in FIG. 5.

FIG. 9 shows a third embodiment of the invention in which the condition of the recording medium R3 subsequent to the recording of dictated material DM is that of recording medium R3 in FIG. 5. As in previous embodiments, this embodiment includes a dictate control 154, a motion means 150, a forward reset control 155, a transcribe control 156, a fast rewind control 158, and a fast forward control 159. There is also an information means 160 to serve the same function as in the embodiments of the invention described above.

The embodiment of FIG. 9, while using two tracks of the recording medium R3, has two frequency generators 161 and 162 each providing a frequency output having a frequency different from that of the other. The frequency generator 161 provides the time line TL, and the time line TL is provided through a switch 164 and a connector 165 to a listening-recording head 152 when the dictate control 154 is causing dictated material DM to be recorded on the recording medium R3. The frequency generator 162 provides both instruction signals IS and end signals ES. In providing an instruction signal IS, the frequency generator 162 is connected by a connector 165, through switch 166 to the listening-recording had 152. Although the time line TL and instruction signals IS are both recorded on the second track 46 of the recording medium R3, the two indexing signals TL and IS are of two different frequencies.

The dictated material DM from the dictate control 154 is provided through a connector 168 to a listening-recording head 151 and the frequency generator 162 provides end signals ES to the same listening-recording head 151 through a switch 169 and a connector 168. Although the dictated material DM and the end signals ES are both recorded on the first track 45 of the recording medium R3, the end signals ES have a frequency outside the audio range of frequencies and a filter network 170 is used to separate end signals ES and dictated material DM for use as in previously described embodiments of the invention. The end signals ES are directed as indexing signals through a switch 171 to the information means 160.

The embodiment of the invention shown in FIG. 9 also includes a second filter network 172 to separate the time line TL and the instruction signals IS for use as indexing signals. The time line TL is directed by a connector 174 to the forward reset control 155 for use in this embodiment in the same manner as in the embodiment of FIG. 6. The instruction signals IS are directed through a switch 175 to the information means 160 and to an instruction signal sensor 176 which controls a switch 178 used in connection with the fast forward control 159 as in previously described embodiments. The fast rewind control 158 operates the two switches 171 and 175 in the same manner as similar switches are operated in previously described embodiments and it will now be understood that the embodiment of the invention shown in FIG. 9 provides the same modes of operation as the previously described embodiments.

Figure 10:
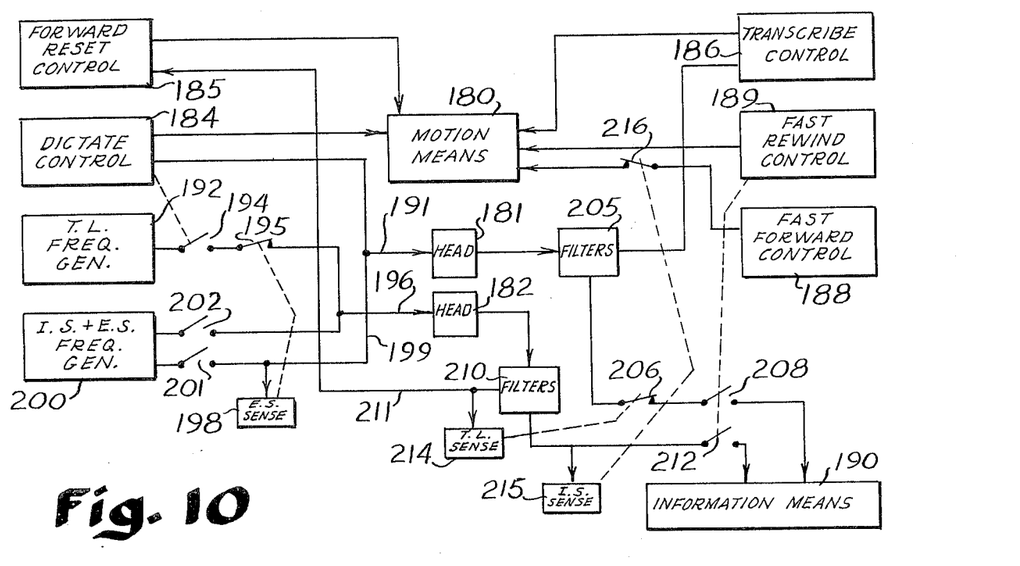
FIG. 10 is a schematic representation illustrating the fourth embodiment of the invention for which the recording medium is shown in FIG. 6.

FIG. 10 shows an embodiment of the invention similar to that shown in FIG. 9 except that in the embodiment of FIG. 10, the recording medium is the recording medium R4 which is shown in FIG. 6 and which is arranged to prevent extraneous frequencies in the dictated material DM on the first track 60 from being mistaken as end signals ES. The embodiment includes a motion means 180, two listening-recording heads 181 and 182, a dictate control 184, a forward reset control 185, a transcribe control 186, a fast forward control 188, a fast rewind control 189 and an information means 190.

The dictated material DM is directed from the dictate control 184 by a connector 191 to the listening-recording head 181; and, a time line TL is provided simultaneously from a frequency generator 192 through a switch 194, which is closed by the dictate control 184, to a connector 196 and a listening-recording head 182. This is similar to the embodiment shown in FIG. 9. However, in the embodiment shown in FIG. 10, a normally closed switch 195 is in series with the switch 194, and this switch 195 is opened in response to an end signal sensor 198.

The end signal sensor 198 is in the connector 199 which connects a frequency generator 200, through a switch 201 to the connector 191 and the listening-recording head 181. The end signal sensor 198 is responsive to an end signal ES from the frequency generator 200 when the switch 201 is closed to cause an end signal ES to be recorded. Thus, in the embodiment of the invention shown in FIG. 10, the recording of an end signal ES on the first track 60 causes the simultaneous opening of the switch 195 and the interruption of the time line TL with a gap 64 on the second track 61.

The frequency generator 200 also provides instruction signals IS by the connector 193 through the switch 202 to the conncetor 196 and listening-recording head 182 when the switch 202 is operated to indicate an instruction. It will now be understood that the listening-recording head 181 records the dictated material DM and end signals ES on the first track 60 of the recording medium R4. However, the end signals ES provided from the frequency generator 200 by operation of te switch 210 are of a frequency outside the audio range of frequencies in order to facilitate their subsequent separation and use as in the embodiments described above.

It will also now be understood that instruction signals IS provided from the frequency generator 200 and the time line TL provided from the frequency generator 192 are both recorded on the second track 61 of the recording medium R4. However, th frequency of the time line TL is different from that of the instruction signals IS to facilitate subsequent separation and use. Further, it will be understood that, coinciding with each end signal ES on the first track 60 of the recording medium R4, there will be a gap 64 in the time line TL on the second track 61 of the recording medium R4, and that as a result there are two conditions corresponding to the end of a unit of dictated material.

As in the embodiment of the invention shown in FIG. 9, a filter network 205 serves as a separating means to separate the dictated material DM from end signals ES during an indexing mode of operation provided the transcribe control 186. The end signals ES are provided as indexing information during an indexing mode of operation through a normally closed switch 206 and a normally open switch 208 to the information means 190. Similarly, a filter network 210 serves as a separating means to separate the time line TL from instruction signals IS and the time line TL is directed by connector 211 to a forward reset control 185 for use in a forward reset mode of operation as in previously described embodiments of the invention. The intruction signals IS are directed through a switch 212 to the information means 190 to be used in the indexing mode of operation as in other embodiments of the invention.

A time signal sensor 214 is responsive to the time line TL on the connector 211 and maintains the switch 206 open so long as there is a time line TL. Thus, when there is a time line TL on the recording medium R4, an end signal ES cannot pass to the information means 190. Since, as previously described, there is a gap 64 in the time line TL corresponding to each actual end signal ES, the switch 206 is closed when, but only when, there is an actual end signal on the first track 60 of the recording medium R4. Thus, as indicated above, two conditions must be provided before an end signal ES will be directed to the information means 190. As in previously described embodiments, there is an instruction signal sensor 215 in the embodiment shown in FIG. 10 which in response to instruction signals IS provide an instruction scanning mode of operation by opening a switch 216 to stop high speed motion of the recording medium R4 in the transcribing direction.

Figure 11:
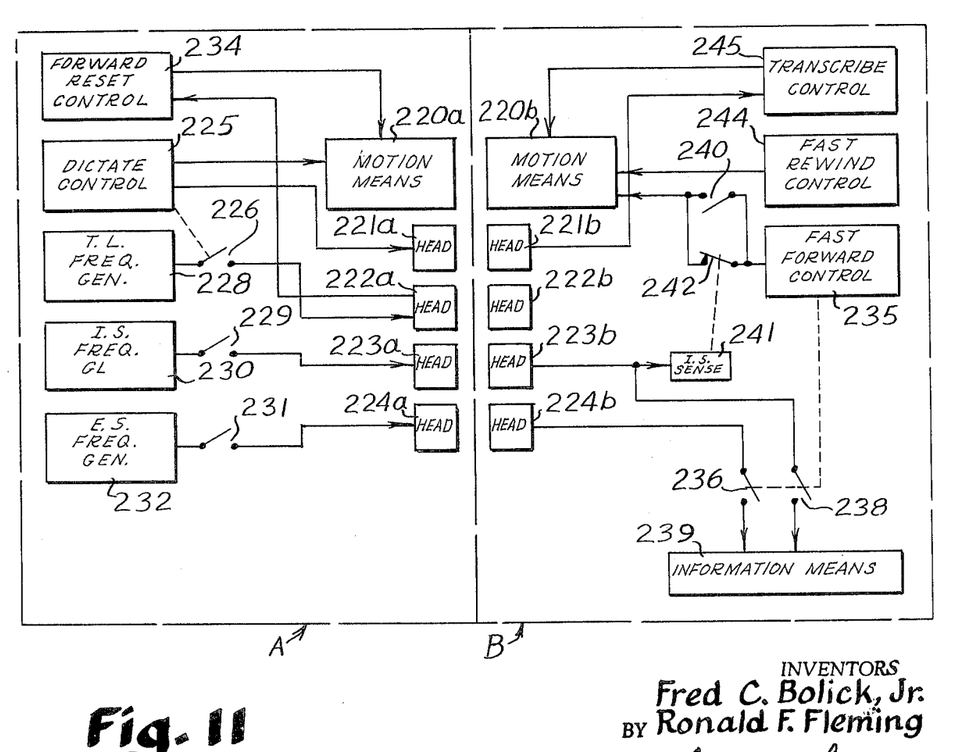
FIG. 11 is a schematic representation illustrating a fifth embodiment of the invention disclosed herein.

A fifth embodiment of the invention is shown in FIG. 11. This embodiment differs from previous embodiments in that there is a set of recording heads 221a, 222a, 223a and 224a used in recording dictated material DM and indexing signals TL, IS and ES and a separate set of listening heads 221b, 222b, 223b and 224b used for providing indexing information and for transcribing the dictated material DM. Those skilled in the art will understand that in a dictation-transcription system of the type shown in FIG. 1, the separate sets of heads 221, 222, 223 and 224 will be in separate dictating and transcribing units and that in a dictation-transcription system of the type shown in FIG. 2, the separate sets of heads 221, 222, 223 and 224 will be in separate locations in the same unit.

When the separate sets of heads are in separate units, the recording medium R is generally moved manually from one unit to the other unit subsequent to recording the dictated material DM and the indexing signals TL, IS and ES but prior to providing indexing information and transcribing the dictated material DM. When the separate sets of heads are in separate locations in the same unit, the recording medium R is moved from the transcribed-type bin 28 to the recorded-tape bin 29 during recording of the dictated material DM and indexing signals TL, IS and ES with one set of heads 221a, 222a, 223a and 224a and is moved from the recorded-tape bin 29 to the transcribed-tape bin 28 during the providing of indexing information and the transcribing of dictated material DM with the second set of heads 221b, 222b, 223b and 224b. However, it will be understood by those skilled in the art that either type of dictation-transcription system 10 or 20 having separate sets of heads may be considered as having a record section A and a transcribe section B.

Moreover, it will also be understood that any of the four embodiments of the invention described above may be modified to provide an embodiment of the invention having a record section A and a separate transcribe section B. It is for this reason that only two embodiments of the invention with separate sections A and B are described below.

In that embodiment of the invention shown in FIG. 11, the record section A includes a motion means 220a with four recording heads 221a, 222a, 223a ad 224a, while the transcribe section B has comparable parts including a motion means 220b and four listening heads 221b, 222b, 223b and 224b. The record section A is arranged as previously described in connection with FIG. 7 since the embodiment of FIG. 11 is a modification of the embodiment of FIG. 7. Thus, the recording medium is the recording medium R1 of FIG. 3 and the record section A includes a dictate control 225 which operates the motion means 220a and causes the dictated material DM to be recorded by the recording head 221a on the first track 40 of the recording medium R1. A switch 226 causes a frequency generator 228 to provide a time line TL for recording on the second track 41 of the recording medium R1 by a recording head 222a. A switch 229 causes a frequency 230 to provide an instruction signal IS for recording on the third track 42 of the recording medium R1 by the recording head 223a. Similarly, a switch 231 causes a frequency generator 232 to provide an end signal ES for recording on the fourth track 44 of the recording medium R1 by the recording head 224a. The recording head 222a is also a listening head and in response to the time line TL on the recording medium R1, it provides a forward reset mode of operation in which the time line TL controls a forward reset control 234 in the same manner as in the embodiment of FIG. 7.

The transcribe section B is arranged in FIG. 11 to provide an embodiment of the invention in a dictation-transcription system 20 of the type shown in FIG. 2 in which the recording medium R1 is placed in the recorded-tape bin 29 for transcribing as the dictated as the dictated material DM is recorded and in which the recording medium R1 does not have to be rewound before the dictated material DM may be transcribed. Because of this characteristic of this type of dictation-transcription system 20, a fast forward control 235 closes two switches 236 and 238 corresponding to the switches 100 and 101 in the embodiment of FIG. 7 which are closed by the fast rewind control 95.

Thus, during the indexing mode of operation of the embodiment shown in FIG. 11, the recording medium R1 is moving in the transcribing direction rather than in the transcribing-reverse direction as in the embodiment of FIG. 7. As the recording medium R1 is moved at high speed in the transcribing direction, the heads 223b and 224b will provide instruction signals IS and end signals ES, respectively, and to an information means 239. During this indexing mode of operation, a switch 240 is held closed so that when a sensor 241 senses an instruction signal IS and attempts to open the switch 242, the motion means 220a will continue to move the recording medium R1 at high speed in the transcribing direction.

As the instruction signals IS and end signals ES are provided as indexing signals to the information means 239 the recording medium R1 is being transferred from the recorded-tape bin 29 to the transcribed-tape bin 28. However, upon completion of the indexing mode of operation, the recording medium R1 is transferred back to recorded-tape bin 29 from the transcribed-tape bin 28 by operation of a fast rewind control 224. Thus, when the fast forward control 235 is again operated with the switch 240 free to open, an instruction scanning mode of operation is provided in which the recording medium R1 will be scanned as in previously described embodiments for instruction signals IS which will each cause the switch 240 to open and stop high speed motion of the recording medium R1. After once again returning the recording medium R1 to the recorded-tape bin 29 from the transcribed-tape bin 28 by operation of the fast rewind control 244, a transcribe control 245 is operated for actual transcribing of the dictated material DM using the indexing information and instructions previously provided.

Figures 12, 13, 14:
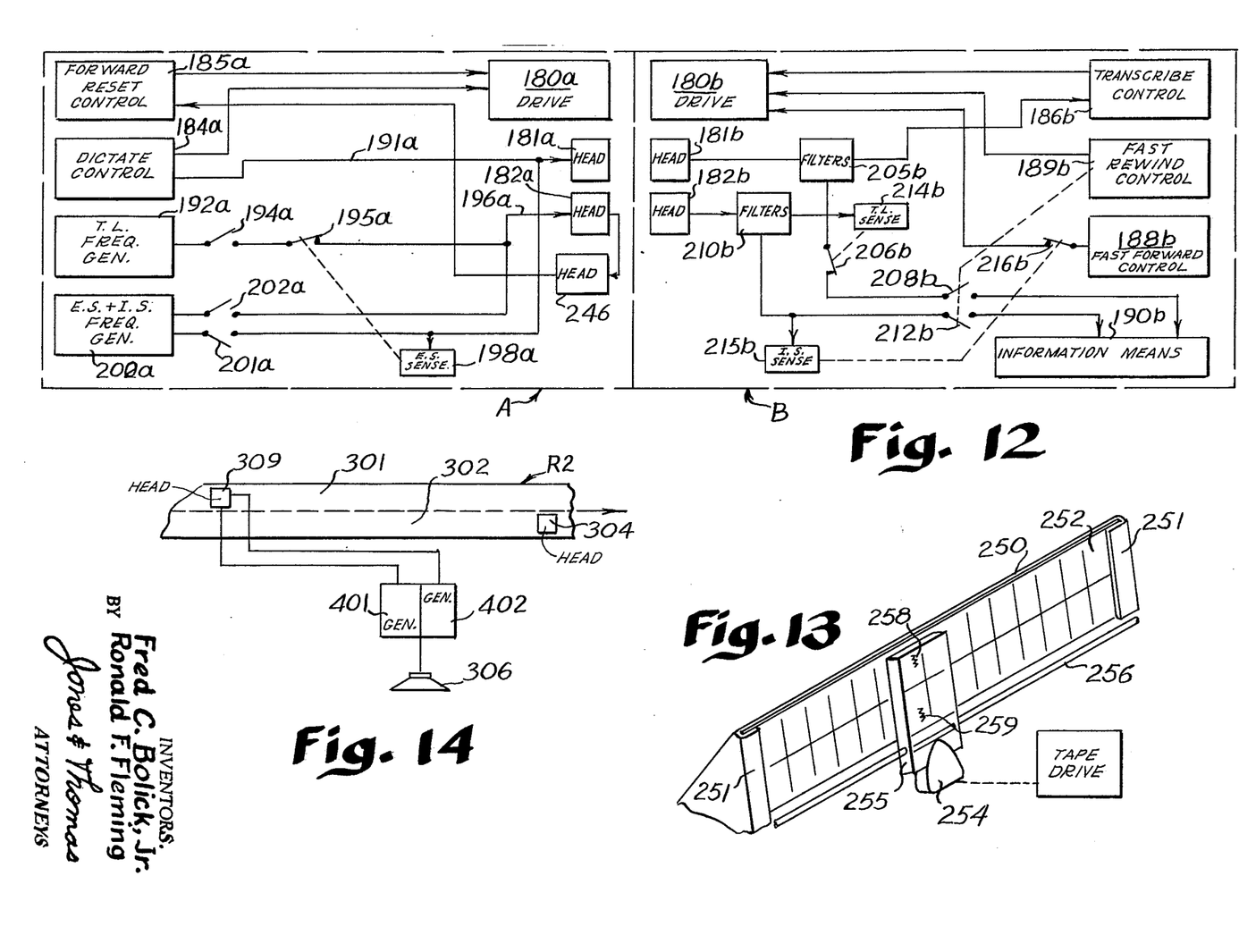

The embodiment shown in FIG. 12 is in a type of dictation-transcription system similar to that shown in FIG. 1 and in which the two sections A and B are in separate units. However, it is simply a modification of the embodiment shown in FIG. 10. Thus, the recording medium is the recording medium R4 of FIG. 6, record section A is shown with an *a* suffix following those reference numerals used in FIG. 10, and the transcribe section B is shown with a *b* suffix following the reference numerals used in FIG. 10.

From the reference numerals used in FIG. 12, it will be understood that the embodiment of the invention shown in FIG. 12 is not only a modification of the embodiment shown in FIG. 10, but it is substantially the same as that embodiment shown in FIG. 10 except that there are separate tape drives 180a and 180b and a set of recording heads 181a and 182a separate from a set of listening heads 181b and 182b. Moreover, there is a filter network 246 in the embodiment of FIG. 12 to provide for the separation of instruction signals IS from the time line TL in both of the separate units A and B of the system. Further, the various controls are separated so that dictating and transcribing of the dictated material DM can occur independently and simultaneously.

The embodiments of the invention shown in FIGS. 11 and 12 have been only briefly described because these embodiments will be readily understood by those skilled in the art from the descriptions of the embodiments shown in FIGS. 7 through 10. Moreover, those skilled in the art will now understand that in all of the embodiments of the invention shown and described, there are time lines TL, end signals ES and instruction signals IS recorded on a recording medium R simultaneously or alternately with dictated material DM, that the time line TL provides an indexing information for control of a forward reset function during dictating and for other purposes, and that the end signals ES and instruction signals IS provide indexing signals to an information means for providing indexing information at any time and as frequently as desired subsequent to the dictating of the dictated material DM.

An information means has been shown only in block form in FIGS. 7 through 12 because it will be understood that an information means may be any device which provides indexing information in response to indexing signals such as end signals ES and instruction signals IS. Thus, the information means may take the form of a permanent scale along which lights provide indicia in response to end signals ES and instruction signals IS or it may take a form which includes a disposable scale, such as paper, in which holes are punched or on which pen or pencil marks or the like are made.

An example of an information means which is suitable for all of the embodiments of the invention described above is shown in FIG. 13. This information means is shown only as a schematic representation since it will be understood from a brief description and by reference to prior art such as that disclosed in U.S. Pat. Nos. 3,304,554 and 3,164,434.

In general terms, the information means shown in FIG. 13 includes a plate 250 having guides 251 which hold a strip 252 made of paper, or other substrate material, that is coated with a heat sensitive material. The heat sensitive material is conveniently an opaque white before being subjected to heat, and turns to a dark color such as dark blue or black when a sufficient quantity of heat is applied.

As a dictation-transcription system 10 or 20 is operated in an indexing mode of operation to provide indexing signals in response to end signals ES and instruction signals IS recorded on a recording medium R, the recording medium R is moving and drive means (not shown) causes an indicator 254 to move correspondingly along the strip 252. The indicator 254 carries with it a pointer 255 which is slideably mounted on a rod 256. The pointer 255 includes a pair of electrical heater elements 258 and 259.

The heater element 258 is located adjacent to the upper edge of the strip 252 and produces sufficient heat in response to an end signal ES to cause the strip 252 to change color. The heater element 255 is located adjacent to the lower edge of the strip 252 and produces sufficient heat in response to an instruction signal IS to cause the strip 252 to change color.

From this brief description of the information means shown in FIG. 13, it will be understood that when the pointer 255 is initially placed at one end of the strip 256 and the pointer 255 is subsequently driven along the strip 252 by appropriate drive means (not shown) so that the position of the pointer 255 along the strip 252 is proportional to the position of a listening head relative to the dictated material DM on a recording medium R, there will be marks adjacent the upper edge of the strip 252 indicative of the locations in the dictated material DM of ends of units of dictated material. Similarly, there will be marks adjacent to lower edge of a strip 252 indicative of the locations in the dictated material DM of instructions with respect to the dictated material DM. It will also be understood that this indexing information and the moving pointer 255 may be subsequently used in conventional manner during the transcribing of the dictated material DM to locate the beginnings of specific units of dictated material and specific instructions.

FIG. 14 shows another information means which may be utilized in the invention disclosed herein. Unlike the information means in FIG. 13 which provides indexing information in visible form as visible indicia, the information means shown in FIG. 14 provides indexing information in audible form. For convenience, the information means shown in FIG. 14 is described in terms of a recording medium R2 having two tracks as in FIG. 4.

Thus, a first track 302 has the dictated material DM recorded thereon, and a second track 301 has the various indexing signals TL, IS and ES described above recorded thereon. The listening-recording head 304 provides the dictated material DM as in all of the embodiments of the invention described above and the listening-recording head 309 provides indexing signals to the information means as in the embodiment of the invention shown in FIG. 8. However, when the information means shown in FIG. 14 is used in an embodiment of the invention such as that shown in FIG. 8, the listening-recording head 309 is displaced along the length of the recording medium R4 from the head 304 so that the head 309 encounters an indexing signal IS or ES associated with a particular location in the dictated material DM before this particular location reaches the head 304.

Thus, the indexing signals ES and IS are being provided to the information means shown in FIG. 14 shortly before the related locations in the dictated material DM reach the head 304. In the information means shown in FIG. 14, the end signals ES are used in conventional manner to cause an audio frequency pulse from a frequency generator 401 and the instruction signals IS are used in conventional manner to cause an audio frequency pulse from a frequency generator 402. The audio frequency pulses from the frequency generators 401 and 402 are of different frequencies and when delivered to a speaker 306, they provide audible indexing information which can be readily distinguished as to type.

Thus, when a dictation-transcription system 10 or 20 having the information means shown in FIG. 14 is operated in an indexing mode, audible indexing information is provided which indicates that an instruction or an end of a unit of dictated material is about to pass a listening-recording head 304. If it is desired to listen to an instruction or to start transcribing at the end of a unit of dictated material, the indexing mode is terminated upon the occurrence of the appropriate indexing signal IS or ES and the dictation-transcription system 10 or 20 is operated in a transcribing mode of operation.

It will now be understood that the method and apparatus of the present invention provide for the recording of dictated material DM and indexing signals TL, IS and ES simply by closing one or more switches. Further, it will be understood that the indexing signals TL, IS and ES are recorded during the course of dictating so that the indexing signals TL, IS and ES are in the appropriate locations on a recording medium R relative to the dictated material DM. Moreover, the indexing signals TL, IS and ES are maintained in these appropriate locations until and as often as indexing information is required.

When indexing information is required, it is simply necessary to operate a dictation-transcription system 10 or 20 in an indexing mode of operation to provide the indexing information in visible, audible or some other form. Whatever its form, the indexing information can be easily replaced in case of loss, as long as the recording medium having the dictated material DM is available. In addition, the indexing signals TL, IS and ES serve as a continuously available basis for controlling the operation of a dictation-transcription system 10 or 20 in a forward reset mode of operation or in an instruction scanning mode of operation.

It will therefore be understood that the particular embodiments of the invention here chosen are by way of illustration only, and are meant to be in no way restrictive. Therefore, numerous changes and modifications may be made, and the full use of equivalents resorted to without departing from the scope of the invention as defined in the appended claims.

We claim:

1. System for recording and subsequently transcribing dictation on a recording medium, comprising:

movement means selectively operative to move a recording medium in either a first direction or a second direction;

first record means operative to record dictated material on the recording medium as the recording medium is moved in a first direction by said movement means;

second record means selectively operative to record indexing signals on the recording medium distinguishable from the recorded dictated material as the recording medium undergoes said first direction movement;

transcribe means operative in response to such recorded dictated material on the recording medium to reproduce the dictated material as the recording medium is moved in the first direction;

indexing signal means operative in response to an indexing signal recorded on the recording medium to provide an indexing signal condition as the recording medium is moved in a selected direction;

dictate control means connected to said movement means and to said first record means and operative to command movement of the recording medium in the first direction and to command operation of said first record means;

indexing control means connected to said movement means and to said indexing signal means and selectively operative to command movement of the recording medium in either of said directions and to command operation of said indexing signal means;

said indexing control means includes movement stop means responsive to the occurrence of said indexing signal condition to terminate said commanded movement of the recording medium only when said indexing control means is commanding movement of the recording medium in a certain one of said directions; and transcribe control means connected to said movement means and operative to command movement of the recording medium in the first direction and to command operation of said transcribe means.

2. System as in claim 1, further comprising:
information means operative to provide an indicium in response to the provision of an indexing signal condition by said indexing signal means.

3. System as in claim 1, wherein:
said second record means is selectively operative to record either a first kind of indexing signal or a second kind of indexing signal, said first and second kinds of recorded indexing signals being distinguishable each from the other and from the recorded dictated material;
said indexing signal means is operative to provide a first kind of indexing signal condition in response to said first kind of recorded indexing signal and is operative to provide a second kind of indexing signal condition in response to said second kind of recorded indexing signal;
said movement stop means is operative only in response to the occurrence of said first indexing signal condition to terminate said commanded certain direction movement of the recording medium; and additionally comprising
information means operative to provide a utilization condition in response to the provision of said second indexing signal condition.

4. System as in claim 3, wherein:
said information means is operative to provide said utilization condition in response to said second kind of indexing signal condition occurring during commanded movement by said indexing control means of the recording medium in the second direction; and
said movement stop means is operative in response to said first kind of indexing signal condition to terminate commanded movement of the recording medium only in the first direction.

5. System as in claim 1, wherein:
said second record means is selectively operative to record a first kind of indexing signal and is additionally operative to continuously record a second kind of indexing signal in response to operation of said dictate control means, said first and second kinds of recorded indexing signals being distinguishable each from the other and from the recorded dictated material.

6. System as in claim 5, wherein:
said second record means is selectively operative to record a third kind of indexing signal as the recording medium undergoes said first direction movement, said third kind of recorded indexing signal being distinguishable from each of said first and second recorded indexing signals and from the recorded dictated material.

7. System as in claim 6, further comprising:
information means operative to provide a first kind of separate utilization condition in response to each of said first kind of recorded index signals, and to provide a second kind of separate utilization condition in response to each of said second kind of recorded index signal.

8. Apparatus for recording and transcribing dictation on a recording medium comprising:
motion means operative to selectively move a recording medium in either a forward direction or a reverse direction;
dictation transducing means selectively operative to record and to play back dictated material in the form of audio signals on the recording medium while said motion means is moving the recording medium in the forward direction;
index signal transducing means selectively operative to record indexing signals on the recording medium distinguishable from the recorded audio signals, while the motion means is moving the recording medium in the forward direction, and to play back said recorded indexing signals while said motion means is moving said recording medium in at least one direction;
indexing control means connected to said motion means and to said index signal transducing means and selectively operative to control movement of said recording medium in either of said directions, and to control concurrent operation of said index signal transducing means to play back said recorded indexing signals;
index signal output means selectively operative to provide a signal output condition in response to said playback of a recorded index signal on the recording medium while the motion means is moving the recording medium in at least one of said directions;
stop means operatively associated with said motion means and operative in response to forward movement controlled by said indexing control means to stop said forward movement in response to the occurrence of said signal output condition; and
transcribe means operative to reproduce said recorded audio signals in the form of audible information while the motion means is moving the recording medium in the forward direction.

9. The system of claim 8 in which said index signal transducing means is positioned for traverse by said recording medium so that each of said recorded indexing signals is selectively disposed on only one of a plurality of zones of said recording medium.

10. The system of claim 8 in which said index signal transducing means is selectively operative to provide a first recorded indexing signal having a first predetermined frequency, and a second recorded indexing signal having a second predetermined frequency; and said stop means is operative to stop said forward movement only in response to said first predetermined frequency of recorded indexing signal.

11. The system of claim 8 in which said dictated material is recorded on a first zone of said recording medium and in which said recorded indexing signals are selectively recorded on a second zone of said recording medium.

12. The system of claim 8 in which said motion means is selectively operative to provide low speed and high speed motion of said recording medium, and in which said stop means is operative responsive to said recorded indexing signal to stop only said selected high speed motion in said forward direction.

13. Apparatus as in claim 8 further comprising:
marker means operatively coupled with said motion means for corresponding movement relative to an index member in response to movement of the recording medium by said motion means; and
said marker means being operative to provide a visible index mark on an index member in response to a signal output from said index signal transducing means.

14. The method of providing indexing information relative to dictated material which is recorded and transcribed using a dictation-transcription system, comprising the steps of:

recording dictated material on a recording medium;

recording indexing signals on the recording medium relative to and distinguishable from said recorded dictated material;

subsequently playing back said recorded index signals to provide indexing information signals relative to said dictated material; and using said information to mark an indicium on an index member corresponding to the relative locations of said recorded index signals on said recording medium, concurrently with said step of playing back.

15. The method of claim 14 in which said recording medium has a plurality of tracks and including the steps of recording said dictated material on one of said plurality of tracks, and concurrently recording the said indexing signals on another of said plurality of tracks.

16. The method of claim 14 in which said indexing signals include first and second types of indexing signals distinguishable from said dictated material and from each other, and including the step of recording said first and second kinds of indexing signals separately by type on said recording medium.

17. Apparatus for transcribing a recording medium containing dictated material in the form of audio signals recorded while the recording medium was moving in a forward direction and also containing recorded indexing signals distinguishable from the audio signals, comprising:

motion means operative to selectively move the recording medium in either a forward direction or a reverse direction;

index signal transducing means responsive to said recorded indexing signals and selectively operative to provide an index signal condition in response to the presence of said recorded indexing signal while said motion means is moving said recording medium in at least one of said directions;

indexing control means connected to said motion means and to said index signal transducing means and selectively operative to control movement of said recording medium in either of said directions and to control concurrent operation of said index signal transducing means to provide said index signal output condition;

said indexing control means being operative to terminate said controlled movement only in response to an index signal condition occurring during said controlled movement of the recording medium in a certain one of said directions; and transcribe means operative to reproduce said recorded audio signals in the form of audible information while the motion means is moving the recording medium in the forward direction.

18. Transcribe apparatus as in claim 17, wherein said certain direction is the forward direction of recording medium movement, and wherein said index control means is responsive to said index signal condition occurring during controlled movement of the recording medium in the reverse direction to mark an indicium on an index member.

19. Transcribe apparatus as in claim 17, for transcribing such recording medium containing first and second kinds of recorded indexing signals in addition to said audio signals, with said indexing signals being distinguishable from each other and from the audio signals, wherein:

said index signal transducing means is operative to provide a first kind of index signal conditions in response to said first kind of recorded indexing signal, and is operative to provide a second kind of index signal condition in response to said second kind of recorded indexing signal;

said indexing control means is operative to provide said termination of controlled movement only in response to said first kind of index signal condition; and means operative to provide a utilization condition in response to said second index signal condition.

20. The method of providing indexing information relative to dictated material which is recorded and transcribed using a dictation-transcription system, comprising the steps of:

recording dictated material on a recording medium;

recording indexing signals on the recording medium relative to and distinguishable from said recorded dictated material;

subsequently playing back said recording medium in a first direction without interruption while providing indexing information signals relative to said dictated materials; and then playing back said recording medium in a second direction with playback interruption in response to each recorded indexing signal.

21. System as in claim 21, wherein said movement stop means is responsive only to an indexing control means movement command in said first direction to terminate said first direction movement in response to occurrence of said indexing signal condition, and said movement stop means is nonresponsive to said indexing signal condition occurring during commanded movement in said second direction.

22. System as in claim 1, further comprising information means responsive to an indexing control means movement command only in said second direction to provide an information signal in response to occurrence of said indexing signal condition.

23. System for recording and subsequently transcribing dictation on a recording medium, comprising:

movement means selectively operative to move a recording medium in either a first direction or a second direction;

first record means operative to record dictated material on the recording medium as the recording medium is moved in a first direction by said movement means;

second record means selectively operative to record either a first kind of indexing signal or a second kind of indexing signal on the recording medium, said first and second kinds of indexing signals being distinguishable from each other and being distinguishable from the recorded dictated material, as the recording medium undergoes said first direction movement; and transcribe means operative in response to such recorded dictated material on the recording medium to reproduce the dictated material as the recording medium is moved in the first direction;

indexing signal means operative in response to an indexing signal recorded on the recording medium to provide an indexing signal condition as the recording medium is moved in a selected direction;

said indexing signal means being operative to provide a first kind of indexing signal condition in response to said first kind of recorded indexing signal and being operative to provide a second kind of indexing signal condition in response to said second kind of recorded indexing signal;

dictate control means connected to said movement means and to first record means and operative to command movement of the recording medium in the first direction and to command operation of said first record means;

indexing control means connected to said movement means and to said indexing signal means and selectively operative to command movement of the recording medium in either of said directions and to command operation of said indexing signal means;

said indexing control means being operative only in response to the occurrence of a certain said kind of said indexing signal conditions during commanded movement of the recording medium only in a certain one of said directions to terminate said commanded movement; and transcribe control means connected to said movement means and to said transcribe means and operative to command movement of the recording medium in the first direction and to command operation of said transcribe means.

24. System as in claim 23, wherein said certain direction of recording medium movement is said first direction.

25. System as in claim 23, further comprising:
utilization means responsive to at least one of said kinds of indexing said signal conditions to provide an indicium condition; and
said utilization means being operative in response to commanded movement of the recording medium in only a certain one of said directions by said indexing control means.

26. The dictation and transcription system comprising:
dictation recording apparatus having first means selectively operative to record dictated material on a recording medium and second means selectively operative to record control signals at locations on said recording medium which correspond to locations of particular units of the dictated material on the recording medium;
said recorded control signals being distinguishable from said recorded dictated material;
transcriber apparatus for receiving said recording medium and including winding means selectively operative to rewind said recording medium;
said transcriber apparatus including signal means operative during said rewind of the recording medium to provide an output signal in response to the presence of each said control signal recorded on the recording medium;
said transcriber apparatus having index producing means comprising a markable index member and a marking means operatively connected to mark said index member in response to said output signal;
said index member and said marking means being movable relative to each other; and
means operatively coupling said index producing means to said winding means for movement of said index member relative to said marking means in response to operation of said winding means.

27. The dictation and transcription system as in claim 26, wherein said winding means is selectively operative to rewind said recordng medium in a reverse direction and to wind said recording medium in a forward direction, and said transcriber apparatus further includes reproducing means responsive to the dictated material recorded on said recording medium to reproduce the dictated material as said recording medium is wound in the forward direction by said winding means.

28. The dictation and transcription system as in claim 26, wherein:
said second means of the dictation recording apparatus comprises means for recording two mutually distinguishable control signal conditions on said recording medium in a predetermined logic pattern which provides said recording condition control signal; and
said signal means of the transcriber apparatus comprises means providing said output signal in response to the presence of said two mutually distinguishable control signal conditions in said predetermined logic pattern on the recording medium being rewound by said winding means.

29. The dictation and transcription method comprising the steps of:
recording a dictated message on a recording medium;
recording a control signal on the recording medium in predetermined relation to and distinguishable from said dictated message recorded thereon; and
subsequently rewinding said recording medium and concurrently reproducing the recorded control signal to provide an information signal, while
using said information signal to make a visible mark on an index member at a location thereon corresponding to the location of said recorded control signal on said recording medium.

30. The dictation and transcription method of claim 29, comprising the additional and subsequent step of winding said recording medium in a forward direction while reproducing the dictated message previously recorded thereon.

* * * * *